United States Patent
Huang et al.

(10) Patent No.: US 9,316,842 B2
(45) Date of Patent: Apr. 19, 2016

(54) SLIT GRATING AND DISPLAY DEVICE

(71) Applicants: BOE Technology Group Co., Ltd., Beijing (CN); Chengdu BOE Optoelectronics Technology Co., Ltd., Chengdu (CN)

(72) Inventors: Xiaomei Huang, Beijing (CN); Fan Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 192 days.

(21) Appl. No.: 13/941,681

(22) Filed: Jul. 15, 2013

(65) Prior Publication Data

US 2014/0016050 A1 Jan. 16, 2014

(30) Foreign Application Priority Data

Jul. 16, 2012 (CN) ...................... 2012 2 0344292 U

(51) Int. Cl.
  *G02F 1/13* (2006.01)
  *G02B 27/22* (2006.01)
  *G02F 1/29* (2006.01)
  *G02F 1/1343* (2006.01)

(52) U.S. Cl.
  CPC ...... *G02B 27/2214* (2013.01); *G02F 1/134309* (2013.01); *G02F 1/29* (2013.01)

(58) Field of Classification Search
  None
  See application file for complete search history.

(56) References Cited

U.S. PATENT DOCUMENTS 7,268,943 B2 * 9/2007 Lee ............................... 359/464

* cited by examiner

*Primary Examiner* — Richard Kim
(74) *Attorney, Agent, or Firm* — Ladas & Parry LLP

(57) ABSTRACT

There are provided a slit grating and a display device. The passive slit grating according to embodiments of the invention comprises a plurality of grating structures. Each of the grating structures is symmetric about its axial line in a length direction, and an edge in the length direction for each of the grating structures has a non-linear shape. Among adjacent edges of any two of the grating structures that are adjacent, the position of a protrusion at one edge corresponds to the position of a recess at another edge.

10 Claims, 4 Drawing Sheets

SLIT GRATING AND DISPLAY DEVICE

CROSS REFERENCE TO RELATED APPLICATIONS

This application claims priority from Chinese National Application No. 201220344292.7, filed on Jul. 16, 2012, the contents of which are incorporated herein by reference.

BACKGROUND

Embodiments of the present invention relate to a slit grating and a display device.

All of displays that are commonly used at present adopt a two-dimensional display, which cannot represent the depth information of scenes visually. With the development of the computer information technology and the display technology, a three-dimensional stereo display technology has become a focus of research in the display field. The reason is that, it can reproduce three-dimensional space information of scenes completely, so as to allow a viewer to see three-dimensional stereo images that emerge out of a screen, stretch out toward the depth and suspend in the air.

Autostereoscopic display technology refers to a display technique, with which, a cubic effect can be observed by naked eyes of a viewer without the necessity of wearing any assistant tool for viewing. Among numerous stereo display technologies, an autostereoscopic display technology based on gratings is now being in wide use due to its features of simple structure, being easy to implementation, good stereoscopic display effect, etc. Gratings comprise two classes basically, i.e., a lenticular grating and a slit grating, where, the slit grating is constituted by a transparent grating thin film having a slit array with alternating bright and dark domains; and the lenticular grating is constituted by a transparent grating plate having a cylindrical array. Because the slit grating has such merits that the structure is simple, the production cost is low, grating parameters are apt to change, a focusing issue does not exist, etc., it is commonly applied to stereoscopic display devices.

As shown in FIG. 1, a grating structure 10 of a conventional slit grating is a straight-strip-shaped structure, and because the structure of a pixel 11 is also a straight-strip-shaped structure, a moire fringe will be generated by the straight-strip-shaped grating structure 10 and the straight-strip-shaped pixel 11 upon stereoscopic display. In order to decrease generated moire fringes, a grating structure 20 in an inclined shape or a special shape is employed, as shown in FIG. 2. Although the generated moire fringes are decreased, the grating structure 20 in an inclined shape or a special shape will bring about differences of transmittance among a sub-pixel R, a sub-pixel G and a sub-pixel B, thereby leading to phenomena of color deviation and crosstalk and a problem of uneven brightness in left and right eyes.

In summary, because the grating structure of a slit grating of an existing stereoscopic display device is an inclined-shaped structure or a special-shaped structure, phenomena of color deviation and crosstalk and a problem of uneven brightness in left and right eyes will result.

SUMMARY

Embodiments of the invention provide a slit grating and a display device, for solving phenomena of color deviation and crosstalk and a problem of uneven brightness in left and right eyes that occur in a stereoscopic display device in prior art.

According to an embodiment of the invention, there is provided a passive slit grating comprising:

a plurality of grating structures;

wherein, each of the grating structures is symmetric about its axial line in a length direction, an edge in the length direction for each of the grating structures has a non-linear shape, and among adjacent edges of any two adjacent grating structures, a position of a protrusion at one edge corresponds to a position of a recess at another edge.

In one example, the length direction of the grating structure is a first direction, the plurality of grating structures are arranged at an interval along a second direction perpendicular to the first direction, and respective axial lines in the length direction for the plurality of grating structures are parallel to each other.

In one example, adjacent edges of any two adjacent grating structures in the passive slit grating have complementary shapes.

In one example, the edge in the length direction for each of the grating structures has the shape of a polygonal line.

In one example, the edge in the length direction for each of the grating structures consists of at least one triangular structure and/or at least one trapezoidal structure.

In one example, the edge in the length direction for each of the grating structures is made up of at least two triangular structures of the same shape and/or at least two trapezoidal structures of the same shape.

In one example, the edge in the length direction for each of the grating structures has the shape of a circular arc curve.

In one example, the edge in the length direction for each of the grating structures is made up of at least one structure having the shape of a circular arc curve.

According to an embodiment of the invention, there is provide an active slit grating comprising: an upper substrate, a lower substrate and liquid crystals located between the upper substrate and the lower substrate; a plurality of electrode strips being provided on a lower surface of the upper substrate and/or an upper surface of the lower substrate;

wherein, each electrode strip is symmetrical about its axial line in a length direction, the shape of an edge of each electrode strip in the length direction is a non-linear shape, and among adjacent edges of any two adjacent electrode strips, a position of a protrusion at one edge corresponds to a position of a recess at another edge.

In one example, on each of the substrates with the plurality of electrode strips provided thereon, the length direction of the electrode strip is a first direction, the plurality of electrode strips are arranged at an interval along a second direction perpendicular to the first direction, and respective axial lines in the length direction for the plurality of electrode strips are parallel to each other.

In one example, a plurality of electrode strips are provided at a surface of the upper substrate on a side facing the lower substrate, and a surface of the lower substrate on a side facing the upper substrate is covered with a plate-like electrode.

In one example, a surface of the upper substrate on a side facing the lower substrate is covered with a plate-like electrode, and a plurality of electrode strips are provided at a surface of the lower substrate on a side facing the upper substrate.

In one example, as for a surface of the upper substrate on a side facing the lower substrate and a surface of the lower substrate on a side facing the upper substrate, a plurality of electrode strips are provided at each of them, the electrode strips on the upper substrate and the electrode strips on the lower substrate are placed in a one-to-one correspondence, and the electrode strips corresponding to each other are of the same shape.

In one example, adjacent edges of any two adjacent electrode strips in the active slit grating have complementary shapes.

In one example, each of the electrode strips is symmetrical about its axial line in a width direction.

In one example, an edge of each of the electrode strips in a length direction has the shape of a polygonal line.

In one example, the edge of each of the electrode strips in the length direction consists of at least one triangular structure and/or at least one trapezoidal structure.

In one example, the edge of each of the electrode strips in the length direction consists of at least two triangular structures of the same shape and/or at least two trapezoidal structures of the same shape.

In one example, an edge of each of the electrode strips in a length direction has the shape of a circular arc curve.

In one example, the edge of each of the electrode strips in the length direction consists of at least one structure having the shape of a circular arc curve.

According to an embodiment of the invention, there is provided a display device, comprising any passive slit grating or active slit grating stated above.

Each grating structure of the passive slit grating or each electrode strip of the active slit grating according to embodiments of the invention are symmetric about its axial line in a length direction, the shape of edges in the length direction for each grating structure or each electrode strip is a non-linear shape, and among adjacent edges of any two adjacent grating structures or any two adjacent electrode strips, the position of protrusion(s) at one edge corresponds to the position of recess(s) at another edge. Therefore, in the course of performing a stereo display via the passive slit grating or the active slit grating, transmittances of two adjacent pixels that are seen by a left eye and a right eye of a viewer at respective sub-pixels R, sub-pixels G and sub-pixels B are complementary, thereby solve problems of color deviation and brightness difference in left and right eyes. Furthermore, when viewing angles for the left and right eyes of the viewer shift, crosstalk can be balanced by adjacent pixels as well, thereby reducing the crosstalk of stereo display.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but are not limitative of the invention.

DETAILED DESCRIPTION

Figure 1:
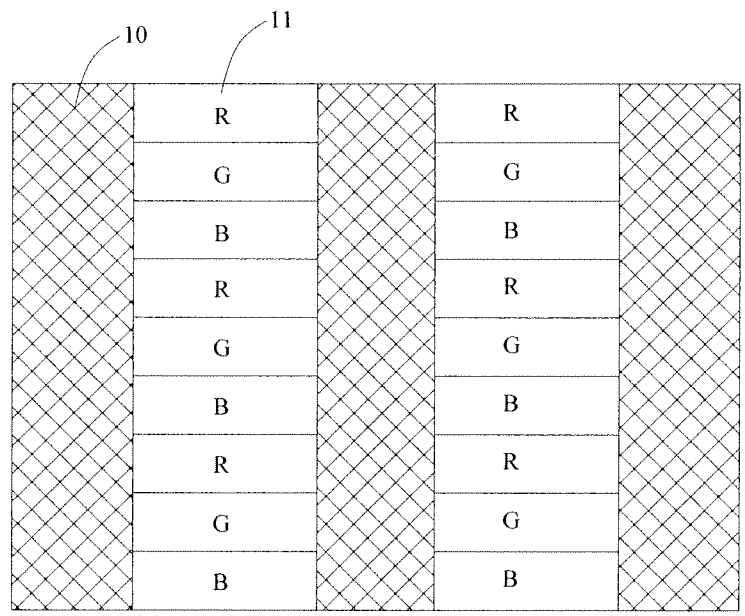
FIG. 1 is a structurally schematic view illustrating a slit grating of the first kind in the background technology.
Figure 2:
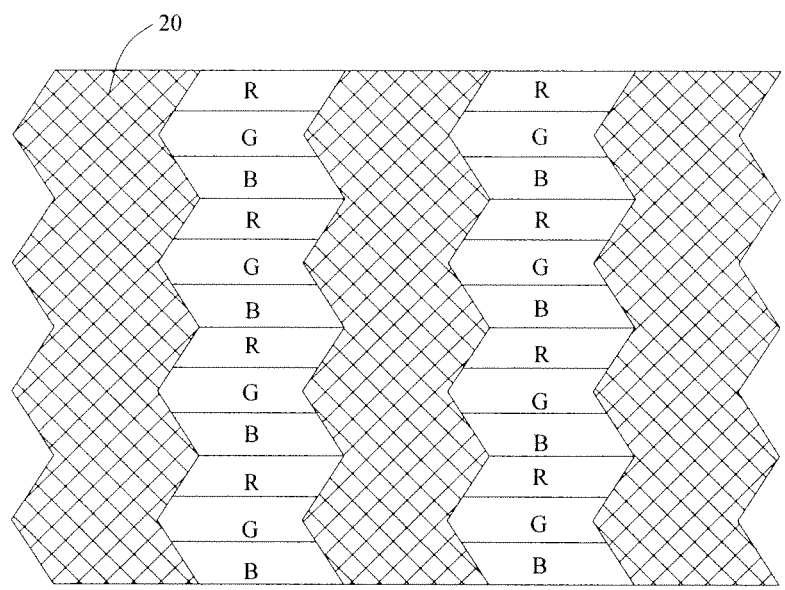
FIG. 2 is a structurally schematic view illustrating a slit grating of the second kind in the background technology.

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which come(s) into the scope sought for protection by the invention.

Each grating structure of a passive slit grating or each electrode strip of an active slit grating in embodiments of the invention is symmetrical about its axial line along a length direction, the shape of an edge of each grating structure or each electrode strip in the length direction is a non-linear shape, and among adjacent edges of any two adjacent grating structures or any two adjacent electrode strips, the position of a protrusion of one edge corresponds to the position of a recess of another edge, so as to solve phenomena of color deviation and crosstalk and a problem of uneven brightness in left and right eyes that occur in an existing stereoscopic display device.

The slit grating according to embodiments of the invention may be a passive slit grating, and may also be an active slit grating. Hereinafter, the configuration of the passive slit grating and the configuration of the active slit grating will be described in detail, respectively.

The passive slit grating according to an embodiment of the invention comprises:
a substrate; and
a plurality of grating structures disposed on the substrate;
wherein, each of the grating structures is symmetric about its axial line in a length direction, an edge of each of the grating structures in the length direction has a non-linear shape, and among adjacent edges of two adjacent grating structures, the position of a protrusion at one edge corresponds to the position of a recess at another edge.

For example, the length direction of the grating structure is a first direction, the plurality of grating structures are arranged at an interval along a second direction perpendicular to the first direction, and respective axial lines in the length direction for the plurality of grating structures are parallel to each other.

For example, the substrate is a transparent substrate.

For example, adjacent edges of any two adjacent grating structures in the passive slit grating have complementary shapes.

An area covered by each grating structure of the passive slit grating is a light shielding zone, and a slit area between any two adjacent grating structures is a light transmitting zone.

For example, the edge of each of the grating structures in the length direction has the shape of a polygonal line.

For example, the edge of each of the grating structures in the length direction consists of at least one triangular structure and/or at least one trapezoidal structure.

Specifically, the edge of each of the grating structures in the length direction may be made up of at least one triangular structure that is arranged successively, may also be made up at least one trapezoidal structure that is arranged successively, and may also be made up of at least one triangular structure and at least one trapezoidal structure that are arranged. Further, it may be possible that it is made up of at least one polygonal-line-shaped structure having other shape that is arranged, or is made up of at least two polygonal-line-shaped structures having different shapes that are arranged successively.

For example, the edge of each of the grating structures in the length direction is made up of at least two triangular structures of the same shape and size that are arranged successively, or is made up of at least two trapezoidal structures of the same shape and size that are arranged successively, or is made up of at least two triangular structures of the same shape and size and at least two trapezoidal structures of the same shape and size, which are arranged successively.

For example, the edge of each of the grating structures in the length direction has the shape of a curve.

Specifically, the edge of each of the grating structures in the length direction may be made up of at least two arc structures having the same shape, may also be made up of at least two arc structures having different shapes, and may also be made up of at least one polygonal-line-shaped structure and at least one arc structure.

The grating structure of the passive slit grating according to embodiments of the invention will be described below in detail in conjunction with accompanied drawings of the specification. For the sake of facilitating the description to the passive slit grating, each of the following embodiments will be described with reference to an example in which a passive slit grating includes three grating structures. However, the number of grating structures of the passive slit grating is not limited thereto, and may be set according to requirements.

Figure 3:
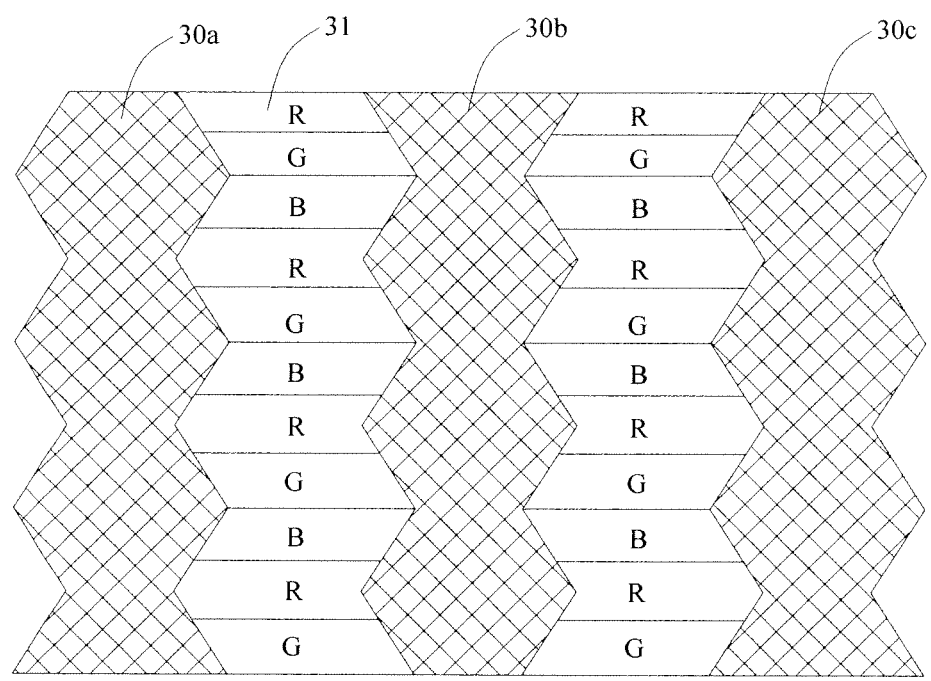
FIG. 3 is a structurally schematic view illustrating a grating structure in a passive slit grating of the first kind according to an embodiment of the invention.

As shown in FIG. 3, a passive slit grating comprises a first grating structure 30a, a second grating structure 30b and a third grating structure 30c, where, the first grating structure 30a, the second grating structure 30b and the third grating structure 30c are symmetrical about respective axial lines in a length direction, respectively, and each of edges in the length direction for the first grating structure 30a, the second grating structure 30b and the third grating structure 30c is made up of a plurality of triangles of the same size that are arranged successively. As can be seen from FIG. 3, as for edges of the first grating structure 30a and the third grating structure 30c in the length direction, the arranging manners in shape completely coincide with each other, and as for edges of the first grating structure 30a and the second grating structure 30b in the length direction, a staggered arrangement happens to the shape, so that the shape of a right edge of the first grating structure 30a in the length direction and the shape of a left edge of the second grating structure 30b in the length direction are complementary, and the shape of a right edge of the second grating structure 30b in the length direction and the shape of a left edge of the third grating structure 30c in the length direction are complementary.

In terms of the passive slit grating shown in FIG. 3, edges in the length direction for grating structures in all of odd-numbered columns have the same shape, edges in the length direction for grating structures in all of even-numbered columns have the same shape, and a staggered arrangement happens to a grating structure in an odd-numbered column and a grating structure in an even-numbered column that are adjacent, so that adjacent edges in the length direction for the grating structure in the odd-numbered column and the grating structure in the even-numbered column that are adjacent have complementary shapes.

In a specific process of implementation, a pixel area 31 located on a display panel can be seen by a viewer through a light transmitting zone between any two adjacent grating structures in the passive slit grating according to the embodiment of the invention.

For example, each of grating structures of a passive slit grating is symmetrical about its axial line along a width direction.

Figure 4:
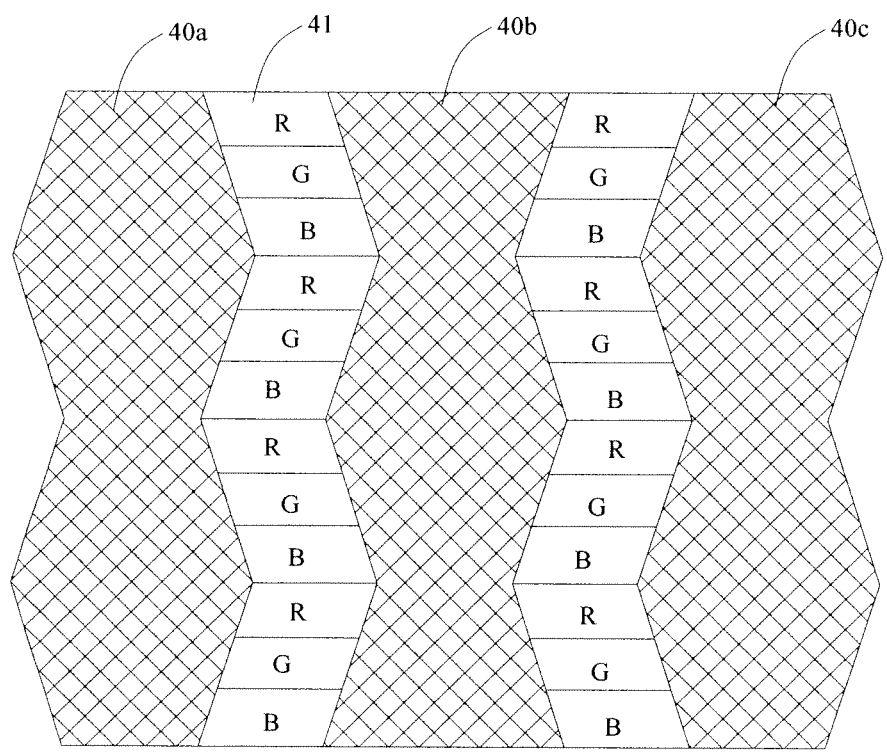
FIG. 4 is a structurally schematic view illustrating a grating structure in a passive slit grating of the second kind according to an embodiment of the invention.

As shown in FIG. 4, the passive slit grating comprises a first grating structure 40a, a second grating structure 40b and a third grating structure 40c, where, areas enclosed by edges of the first grating structure 40a, the second grating structure 40b and the third grating structure 40c are symmetrical about axial lines of respective areas in a length direction and in a width direction, respectively. Namely, each of the first grating structure 40a, the second grating structure 40b and the third grating structure 40c is symmetrical bilaterally and longitudinally, and each of the edges in the length direction for the first grating structure 40a, the second grating structure 40b and the third grating structure 40c is made up of two triangles of the same size that are arranged successively. As can be seen from FIG. 4, edges of the first grating structure 40a and the third grating structure 40c in the length direction have the same shape, and as for edges of the first grating structure 40a and the second grating structure 40b in the length direction, a staggered arrangement happens to the shape, so that the shape of a right edge of the first grating structure 40a in the length direction and the shape of a left edge of the second grating structure 40b in the length direction are complementary, and the shape of a right edge of the second grating structure 40b in the length direction and the shape of a left edge of the third grating structure 40c in the length direction are complementary.

In terms of the passive slit grating shown in FIG. 4, edges in the length direction for grating structures in all of odd-numbered columns have the same shape, edges in the length direction for grating structures in all of even-numbered columns have the same shape, and a staggered arrangement happens to a grating structure in an odd-numbered column and a grating structure in an even-numbered column that are adjacent, so that adjacent edges in the length direction for the grating structure in the odd-numbered column and the grating structure in the even-numbered column that are adjacent have complementary shapes.

In a specific process of implementation, a pixel area 41 of a display device can be seen by a viewer through an opening region between two adjacent grating structures in the passive slit grating according to the embodiment of the invention.

For example, an area enclosed by edges of each of grating structures of a passive slit grating is symmetrical about an axial line of the area in a width direction.

Figure 5:
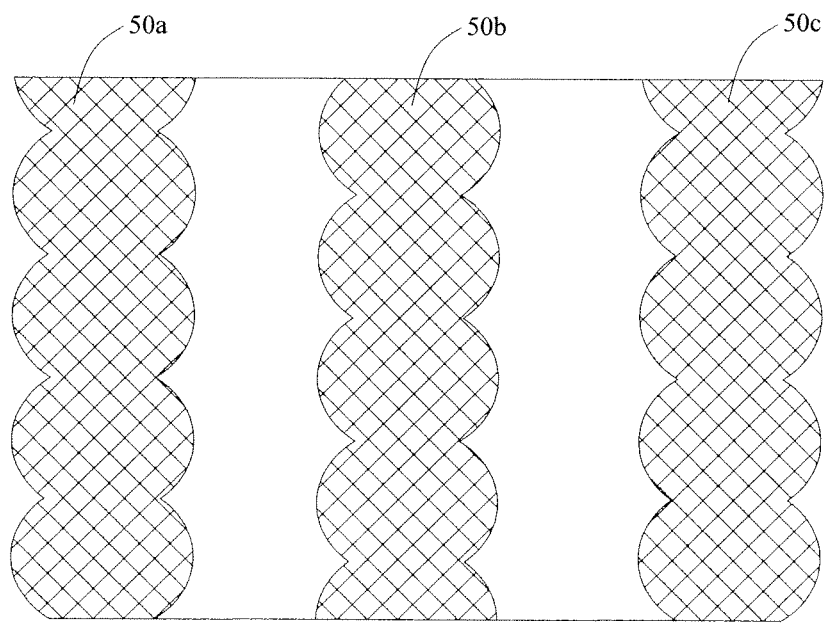
FIG. 5 is a structurally schematic view illustrating a grating structure in a passive slit grating of the third kind according to an embodiment of the invention.

As shown in FIG. 5, the passive slit grating comprises a first grating structure 50a, a second grating structure 50b and a third grating structure 50c, where, areas enclosed by edges of the first grating structure 50a, the second grating structure 50b and the third grating structure 50c are symmetrical about axial lines of respective areas in a length direction, respectively. Namely, each of the first grating structure 50a, the second grating structure 50b and the third grating structure 50c is symmetrical bilaterally in the length direction, and each of the edges in the length direction for the first grating structure 50a, the second grating structure 50b and the third grating structure 50c has the shape of a curve. As can be seen from FIG. 5, edges of the first grating structure 50a and the third grating structure 50c in the length direction have the same shape, and as for the first grating structure 50a and the second grating structure 50b, a staggered arrangement occurs in the length direction, so that the position of protrusions at a right edge of the first grating structure 50a in the length direction corresponds to the position of recesses at a left edge of the second grating structure 50b in the length direction, and the position of protrusions at a right edge of the second grating structure 50b in the length direction corresponds to the position of recesses at a left edge of the third grating structure 50c in the length direction.

In terms of the passive slit grating shown in FIG. 5, edges in the length direction for grating structures in all of odd-numbered columns have the same shape, edges in the length direction for grating structures in all of even-numbered columns have the same shape, and a staggered arrangement happens to a grating structure in an odd-numbered column and a grating structure in an even-numbered column that are adjacent, so that among edges in the length direction for the grating structure in the odd-numbered column and the grating structure in the even-numbered column that are adjacent, the position of protrusions at one edge correspond to the position of recesses at another edge.

In a specific process of implementation, a pixel area of a display device can be seen by a viewer through a light transmitting zone between two adjacent grating structures in the passive slit grating according to the embodiment of the invention.

For example, each of grating structures of a passive slit grating is symmetrical about its axial line along a width direction.

Embodiments of the invention do not set a limit to the substance for grating structures in the passive slit grating, and every material well-known by those skilled in the art that can be used for light shielding may be applied to the present invention.

The active slit grating according to an embodiment of the invention comprises an upper substrate, a lower substrate and liquid crystal located between the upper substrate and the lower substrate; wherein, each electrode strip is symmetrical about its axial line in a length direction, the shape of an edge of each electrode strip in the length direction is a non-linear shape, and among adjacent edges of any two adjacent electrode strips, the position of a protrusion at one edge corresponds to the position of a recess at another edge.

For example, on each of the substrates with the plurality of electrode strips provided thereon, the length direction of the electrode strip is a first direction, the plurality of electrode strips are arranged at an interval along a second direction perpendicular to the first direction, and respective axial lines in the length direction for the plurality of electrode strips are parallel to each other.

Specifically, the configuration of electrode strip for the upper substrate and the lower substrate of the active slit grating according to the embodiment of the invention includes the following three cases:

The first configuration: a plurality of electrode strips are provided at a surface of the upper substrate on a side facing the lower substrate, and a side of the lower substrate facing the upper substrate is covered with a plate-like electrode;

The second configuration: a side of the upper substrate facing the lower substrate is covered with a plate-like electrode, and a plurality of electrode strips are provided at a surface of the lower substrate on a side facing the upper substrate;

The third configuration: for a surface of the upper substrate on a side facing the lower substrate and a surface of the lower substrate on a side facing the upper substrate, a plurality of electrode strips are provided at each of them, where, the plurality of electrode strips at the lower surface of the upper substrate and the plurality of electrode strips at the upper surface of the lower substrate have the same arrangement. For example, the plurality of electrode strips on the upper substrate and the plurality of electrode strips on the lower substrate are placed in a one-to-one correspondence, and the electrode strips corresponding to each other are of the same shape. However, the embodiments of the invention are not limited thereto. Alternatively, the electrode strips with not-linear edges as mentioned above are provided on one of the upper and lower substrates, and electrode strips with linear edges in their length direction are provided on the other substrate. In this case, the electrode strips corresponding to each other on the upper and lower substrates are not necessarily of the same shape, but the width of each electrode strip with linear edges on one substrate is needed to be larger than the maximum width of the corresponding electrode strip with non-linear edges on the other substrate.

For example, adjacent edges of any two adjacent electrode strips in the active slit grating according to the embodiment of the invention have complementary shapes.

The plurality of electrode strips of the active slit grating according to the embodiment of the invention are of a transparent conductive material, such as, indium tin oxide (ITO) material, indium zinc oxide (IZO) material, or the like.

The plate-like electrode is of a transparent conductive material, such as, ITO material, IZO material, or the like.

For example, each of the electrode strips is symmetrical about its axial line in a width direction.

For example, an edge of each of the electrode strips in a length direction has the shape of a polygonal line.

For example, the edge of each of the electrode strips in the length direction consists of at least one triangular structure and/or at least one trapezoidal structure.

For example, the edge of each of the electrode strips in the length direction consists of at least two triangular structures that are identical and/or at least two trapezoidal structures that are identical.

For example, an edge of each of the electrode strips in a length direction has the shape of a circular arc curve.

For example, the edge of each of the electrode strips in the length direction consists of at least one structure having the shape of a circular arc curve.

The configuration of the plurality of electrode strips in the embodiment is similar to the grating structure shown in FIG. 3 to FIG. 5, details being omitted here.

With the second configuration (namely, there is a plate-like electrode that covers a surface of the upper substrate on a side facing the lower substrate, and a plurality of electrode strips are provided at a surface of the lower substrate on a side facing the upper substrate) as an example, the configuration of the active slit grating according to the embodiment of the invention will be described below in detail. Other configurations have similar situations, and details are omitted here.

Figure 6:
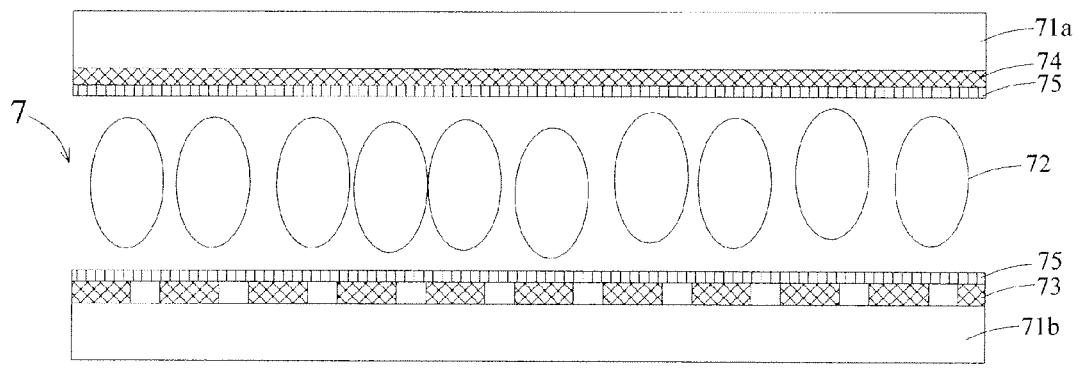
FIG. 6 is a structurally schematic view illustrating an active slit grating according to an embodiment of the invention.

As shown in FIG. 6, the active slit grating 7 comprises: an upper substrate, 71a, a lower substrate 71b and liquid crystals 72 located between the upper substrate 71a and the lower substrate 71b; wherein, a plurality of electrode strips 73 are provided at an upper surface of the lower substrate 71b (i.e. on a side facing the liquid crystals 72) and a plate-like electrode 74 is provided at a lower substrate of the upper substrate 71a (i.e. on a side facing the liquid crystals 72);

each of the electrode strips 73 is symmetrical about its axial line in a length direction, the shape of an edge in the length direction for each of the electrode strips 73 is a non-linear shape, and adjacent edges of two adjacent electrode strips 73 have complementary shapes.

The electrode strips 73 and the plate-like electrode 74 each are of a transparent conductive material, such as ITO material, IZO material, or the like.

The active slit grating 7 further includes:

an alignment film 75 that covers outer surfaces of all of electrode strips 73 and the plate-like electrode 74 (i.e. on a side facing the liquid crystals 72).

With the grating structure shown in FIG. 3 as an example, the principle of stereoscopic display of a display device to which a passive slit grating according to an embodiment of the invention is applied will be described below in detail. Because the principle of a display device to which an active slit grating is applied is similar to that, details are omitted here.

Figure 7:
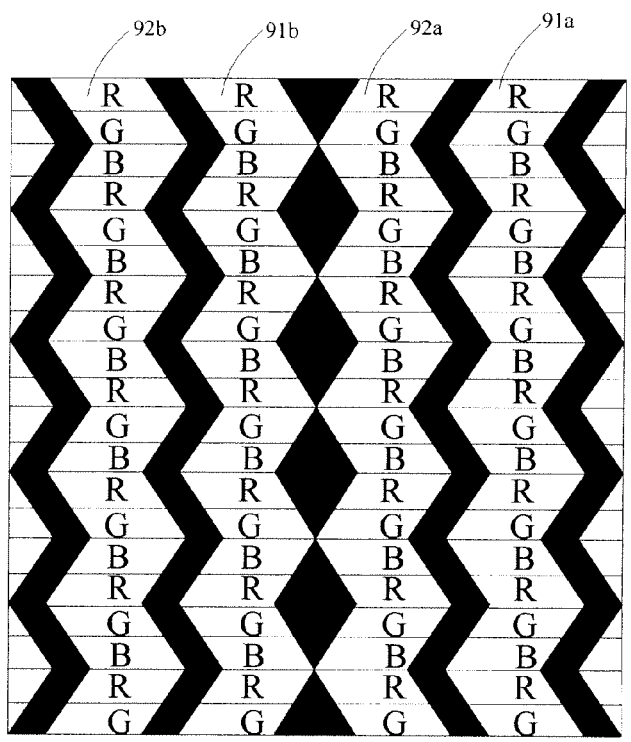
FIG. 7 is a pixel projection drawing that is received by left and right eyes of a viewer via the slit grating shown in FIG. 3 after the slit grating is applied to a display device.

When the passive slit grating shown in FIG. 3 is employed, a pixel projection drawing that is received by left and right eyes of a viewer via the slit grating is shown in FIG. 7. The area of a region where light that is transmitted by a pixel column 91*a* and received by a right eye via a light transmitting zone on one side of a certain grating structure of the passive slit grating is located is SR1, the area of a region where light that is transmitted by a pixel column 92*a* and received by a left eye via the same light transmitting zone regarding the grating structure is located is SL1; and, the area of a region where light that is transmitted by a pixel column 91*b* and received by the right eye via a light transmitting zone on another side of the grating structure is located is SR2, the area of a region where light that is transmitted by a pixel column 92*b* and received by the left eye via the same light transmitting zone regarding the grating structure is located is SL2.

As can be seen from FIG. 7, the region where light that is transmitted by the pixel column 92*a* and received by the left eye is located and the region where light that is transmitted by the pixel column 92*b* and received by the left eye is located have complementary edges, the region where light that is transmitted by the pixel column 91*a* and received by the right eye is located and the region where light that is transmitted by the pixel column 91*b* and received by the right eye is located have complementary edges, and SL1+SL2=SR1+SR2. Namely, a sum of area of regions, where light that is transmitted by pixel columns and received by the left eye via light transmitting zones on two sides of a grating structure is located, is equal to a sum of area of regions, where light that is transmitted by pixel columns and received by the right eye via light transmitting zones on two sides of the grating structure is located. Furthermore, when viewing angles for left and right eyes of a viewer shift, it is still possible maintain SL1+SL2=SR1+SR2. Thus, such problems can be solved: there is an overall color deviation in a stereo display picture and there is a difference of brightness in left and right eyes.

According to an embodiment of the invention, there is provided a display device, comprising the above passive slit grating or active slit grating and a two-dimensional display panel or device. Any proper arranging relationship in the art may be used between the slit grating and the two-dimensional display panel or device, and details are omitted here. For example, the display device is a three-dimensional display device.

The two-dimensional display panel or device in the display device stated in the embodiment of the invention may be a liquid crystal panel, a liquid crystal display, an OLED (Organic Light Emitting Diode) panel, an OLED display, a plasma display, an electronic paper, or other display panel or device.

Although preferred embodiments of the invention have been described, additional changes and modifications can be made to these embodiments by those skilled in the art once they learn the basic concept of creativity. So, attached claims are intended to be construed as encompassing preferred embodiments and all changes and modifications that come within the scope of the invention.

Edges of each grating structure of the passive slit grating according to embodiments of the invention are symmetric about its axial line in a length direction, the shape of edges of each grating structure in the length direction is a non-linear shape, and among adjacent edges of any two adjacent grating structures, the position of protrusion(s) at one edge corresponds to the position of recess(s) at another edge. Therefore, in the course of performing a stereo display via the slit grating, transmittances of two adjacent pixels that are seen by a left eye and a right eye of a viewer at respective sub-pixels R, sub-pixels G and sub-pixels B are complementary, thereby solve problems of color deviation and brightness difference in left and right eyes. Furthermore, when viewing angles for the left and right eyes of the viewer shift, crosstalk can be balanced by adjacent pixels as well, thereby reducing the crosstalk of stereo display.

Edges of a plurality of electrode strips that are disposed on an upper substrate and/or a lower substrate in the active slit grating according to embodiments of the invention are symmetric about their axial lines in a length direction, the shape of edges of each electrode strip in the length direction is a non-linear shape, and among adjacent edges of any two adjacent electrode strips, the position of protrusion(s) at one edge corresponds to the position of recess(s) at another edge. Therefore, in the course of performing a stereo display via the active slit grating, transmittances of two adjacent pixels that are seen by a left eye and a right eye of a viewer at respective sub-pixels R, sub-pixels G and sub-pixels B are complementary, thereby solve problems of color deviation and brightness difference in left and right eyes. Furthermore, when viewing angles for the left and right eyes of the viewer shift, crosstalk can be balanced by adjacent pixels as well, thereby reducing the crosstalk of stereo display.

Descriptions made above are merely exemplary embodiments of the invention, but are not used to limit the protection scope of the invention. The protection scope of the invention is determined by attached claims.

What is claimed is:

1. A passive slit grating, comprising a plurality of grating structures,
    wherein, each of the grating structures is symmetric about its axial line in a length direction, an edge in the length direction for each of the grating structures has a non-linear shape, and among adjacent edges of any two of the grating structures that are adjacent, a position of a protrusion at one edge corresponds to a position of a recess at another edge, and wherein edges in the length direction for two adjacent grating structures are different, edges in the length direction for grating structures in odd-numbered columns have the same shape, and edges in the length direction for grating structures in even-numbered columns have the same shape.

2. The passive slit grating according to claim 1, wherein, the length direction of the grating structures is a first direction, the plurality of grating structures are arranged at an interval along a second direction perpendicular to the first direction, and respective axial lines in the length direction for the plurality of grating structures are parallel to each other.

3. The passive slit grating according to claim 1, wherein, adjacent edges of any two of the grating structures that are adjacent in the passive slit grating have complementary shapes.

4. The passive slit grating according to claim 1, wherein, each of the grating structures is symmetrical about its axial line along a width direction.

5. The passive slit grating according to claim 4, wherein, the edge in the length direction for each of the grating structures has the shape of a polygonal line.

6. The passive slit grating according to claim 5, wherein, the edge in the length direction for each of the grating structures consists of at least one triangular structure and/or at least one trapezoidal structure.

7. The passive slit grating according to claim 6, wherein, the edge in the length direction for each of the grating structures is made up of at least two triangular structures of the same shape and/or at least two trapezoidal structures of the same shape.

8. The passive slit grating according to claim 1, wherein, the edge in the length direction for each of the grating structures has the shape of a circular arc curve.

9. The passive slit grating according to claim 8, wherein, the edge in the length direction for each of the grating structures is made up of at least one structure having the shape of a circular arc curve.

10. A display device, comprising the passive slit grating according to claim 1.

\* \* \* \* \*